INVENTOR.
Anton F. Erickson
BY
O. D. McGraw
HIS ATTORNEY

Nov. 30, 1965   A. F. ERICKSON   3,220,514
AIR COOLED EXTERNAL BAND BRAKE
Filed Nov. 20, 1963   3 Sheets-Sheet 2

INVENTOR.
Anton F. Erickson
BY
D. D. McGraw
HIS ATTORNEY

INVENTOR.
Anton F. Erickson
BY
D. D. McGraw
HIS ATTORNEY 3,220,514
Patented Nov. 30, 1965

1

3,220,514
AIR COOLED EXTERNAL BAND BRAKE
Anton F. Erickson, Dayton, Ohio, assignor to General Motors Corporation, Detroit, Mich., a corporation of Delaware
Filed Nov. 20, 1963, Ser. No. 325,016
8 Claims. (Cl. 188—77)

This invention relates to external band type brakes and more particularly to a type of external band brake wherein a fan type wheel is employed for cooling and a force multiplying linkage is used for actuation.

In brakes having an external band, several problems exist in the operation thereof which include cooling the drum and effective actuating components. Due to the mounting of brake linings on the outside of a brake drum, the brake drum itself is substantially enclosed and, therefore, not subjected to the cooling of outside air.

It is an object of the present invention to provide a brake drum for use with external band type brakes which has means for directing air toward the heated surfaces.

It is another object of the present invention to provide a brake drum for use with external band type brakes which has cooling means that also function as support members.

It is still another object of the present invention to provide a linkage for use with external band type brakes that will multiply the force exerted during actuation thereof.

It is a further object of the present invention to provide force multiplying linkage means that will function in the operation of an emergency brake system connected to the external band type brake.

It is still a further object of the present invention to provide a type of force multiplying linkage for use with an external band type brake which will draw an externally mounted band toward a brake drum from opposite directions by use of a wheel cylinder moving in one direction.

Further objects and advantages of the present invention will be apparent from the following description, reference being had to the accompanying drawings wherein a preferred embodiment of the present invention is clearly shown.

Figure 1:
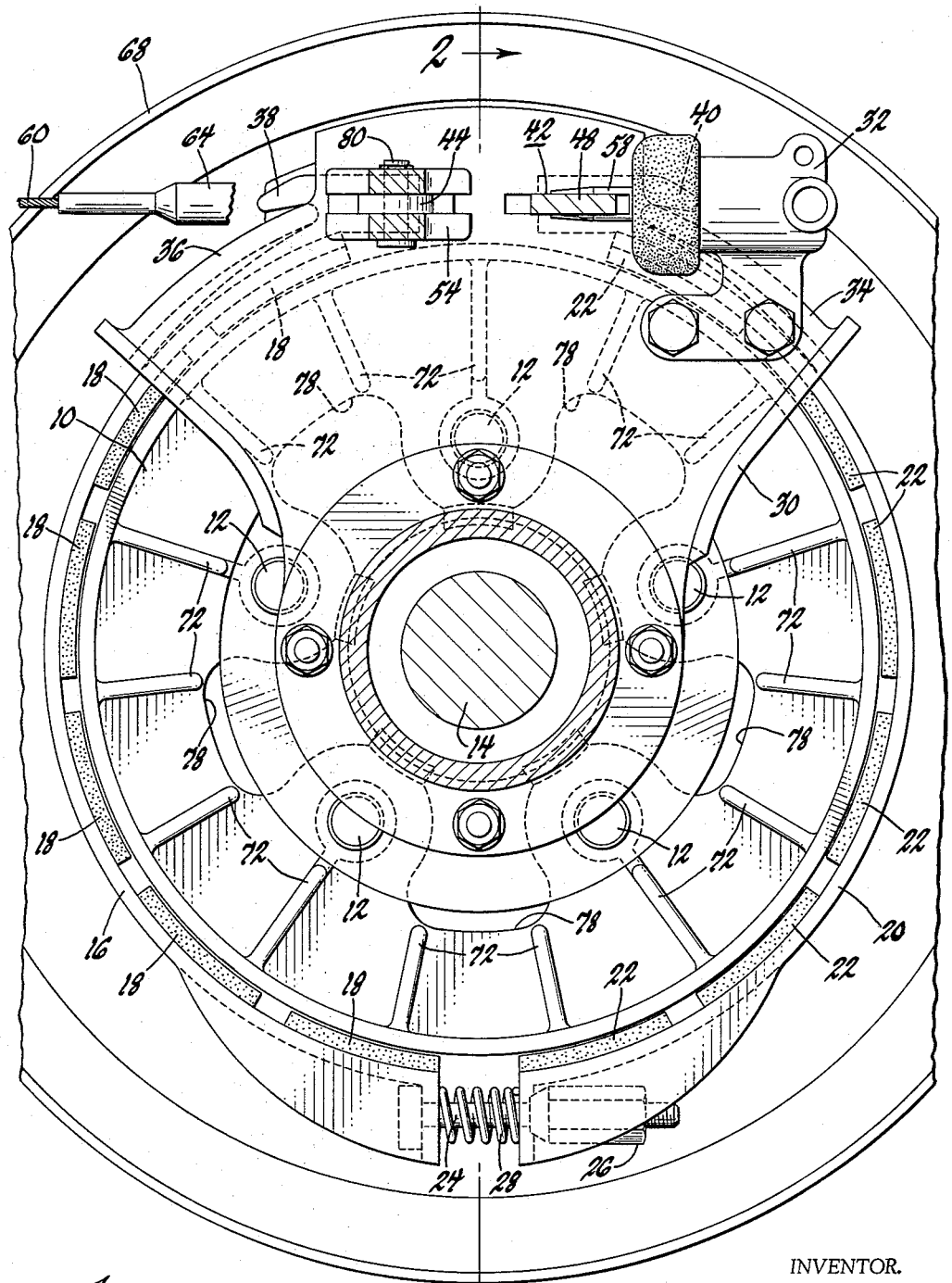
FIGURE 1 illustrates a brake assembly made in accordance with the present invention.

Referring now to FIGURE 1, a brake drum 10 is mounted by means of a series of fastening bolts 12 to an axle assembly 14 and arranged to rotate therewith. A brake shoe 16 carrying a lining 18 and a brake shoe 20 carrying a lining 22 are circumferentially mounted on the outer periphery of the brake drum 10. On one end, the brake shoe 16 and the brake shoe 20 are connected by means of a bolt 24 cooperating with a nut 26. The nut 26 and bolt 24 serve as an adjusting means to vary the position of the brake linings 18 and 22 relative to the drum 10 as the brake linings wear during operation of the brake over a prolonged period of time. A spring 28 serves to bias the brake shoe 16 away from the brake shoe 20 to prevent an accidental change in the adjusting relationship set up between the bolt 24 and the nut 26.

An anchor plate 30 carries a wheel cylinder 32 and has integrally formed holding flanges 34 and 36 disposed to cooperate with outwardly projecting hooks 38 and 40. The outwardly projecting hooks 38 and 40 are integrally formed as portions of the brake shoes 16 and 20, respectively. This cooperation between the holding flanges 34 and 36 and the outwardly projecting hook portions 38 and 40 is also clearly seen in FIGURE 4.

Figure 3:
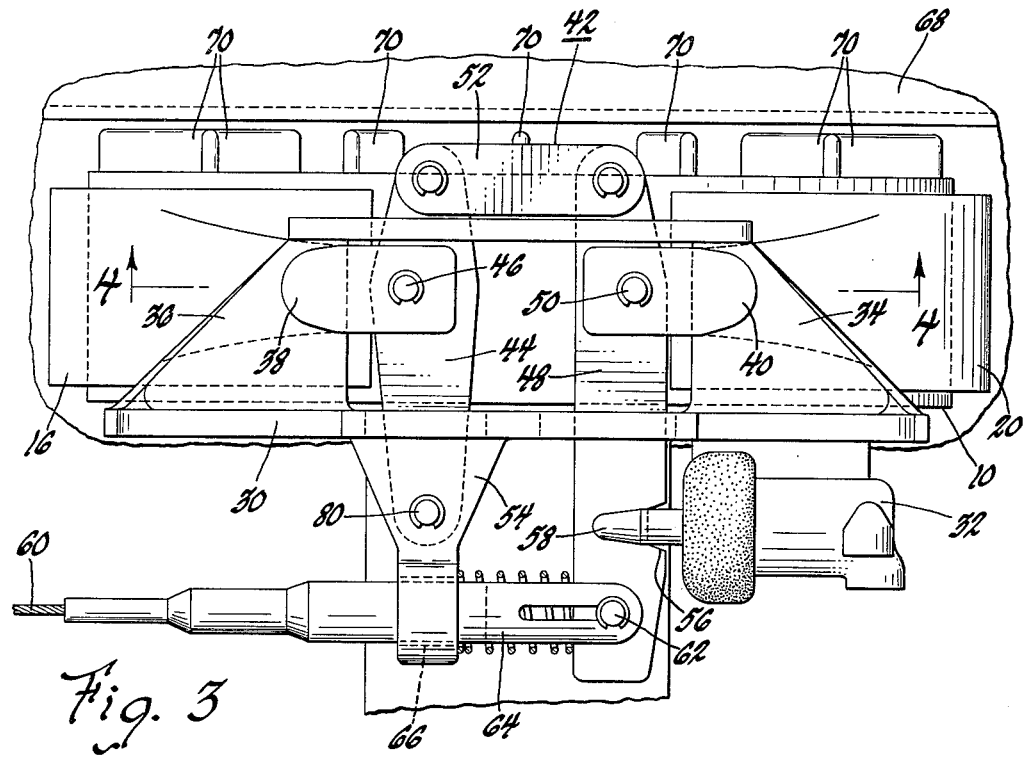
FIGURE 3 illustrates the force multiplying linkage mechanism in elevation, taken along the line 3—3 of FIGURE 2.

Referring now to FIGURE 3, a parallelogram-type linking mechanism, generally designated by the numeral 42, has a link 44 pivotally mounted on the outwardly projecting hook portion 38 at point 46. A link 48 is pivotally mounted on the outwardly projecting hook portion 40 at point 50. The link 44 and the link 48 are pivotally connected to a link 52. The link 44 is also pivotally mounted on a flange section 54 projecting from the anchor plate 30. The link 48 has a slot 56 cooperating with a piston rod 58 of the wheel cylinder 32. An emergency brake cable 60 is pivotally connected to the link 48 at point 62 by means of a holding assembly 64. The flange section 54 has an aperture 66 larger than the holding assembly 64 through which the holding assembly can freely pass during actuation of the emergency brake.

Figure 2:
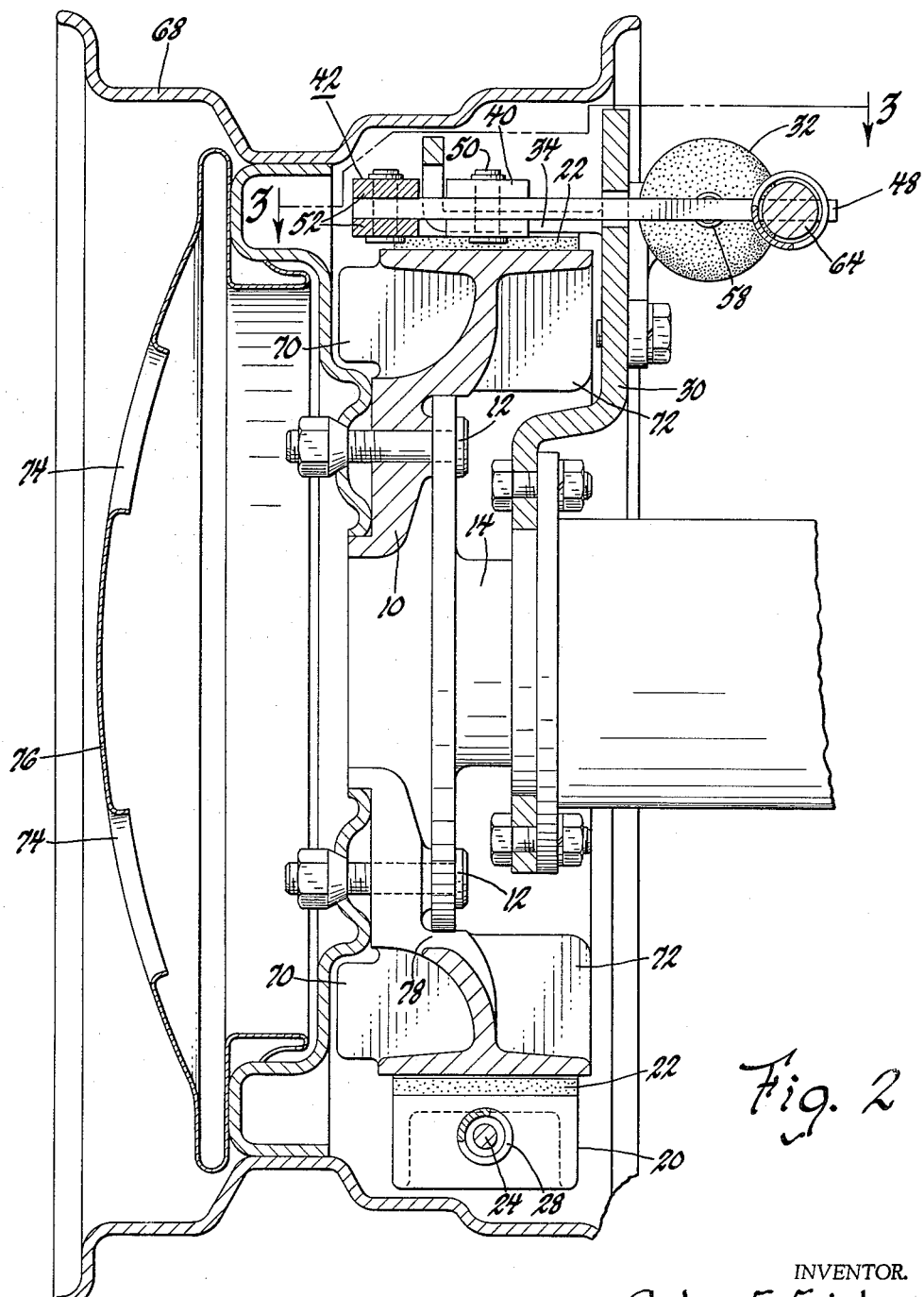
FIGURE 2 is a sectional view taken along line 2—2 of FIGURE 1.

Referring now to FIGURE 2, a wheel 68 is mounted so as to rotate with the axle assembly 14 through the series of bolts 12 which hold the drum 10 in its operative position. FIGURE 2 more clearly illustrates the relationship of the anchor plate 30 to the brake drum 20. A series of vanes 70 on one side of the drum 10 and a series of vanes 72 on the opposite side of the drum 10 are disposed to drive cooling air against the surface of the brake drum opposite the surface on which the linings bear to assist in the dissipation of heat therefrom. These vanes are also clearly seen in FIGURE 1. Access ports or inlets 74 may be spaced at scattered intervals in the surface of a wheel disc 76 to admit air from the atmosphere to the inner periphery of the drum 10. A series of contoured apertures 78 in the drum 10, as best seen in FIGURE 1, serve to admit air into the space in which the vanes 70 and 72 rotate. It should be noted that the vanes 70 and 72, in addition to serving as fins for cooling the brake drum, also serve as support members for the drum itself.

In operation, the subject device is mounted on a motor vehicle having a hydraulic braking system of common design. The drum 10 rotates with the wheel and the brake shoes. Attached brake linings, carried by the anchor plate 30, remain fixed relative to the rotating wheel and drum.

Referring now to FIGURE 3, as hydraulic pressure in the wheel cylinder 32 moves the piston rod 58 toward the link 48, the link 48 is caused to move in a clockwise direction around the pivot point 50. This clockwise rotation of the link 48 will draw the link 52 in a rightward direction, as viewed in FIGURE 3, which will induce a clockwise rotation in the link 44 around a pivot point 80. The clockwise rotating link 44, being pivotally attached at 46 to the outwardly projecting hook portion 38, will draw the brake shoe 16 to the right as viewed in FIGURE 3. Assuming the direction of rotation of the drum is clockwise, as viewed in FIGURE 1, the brake shoe 16 will likewise be driven in a clockwise direction when it contacts the drum 10.

Figure 4:
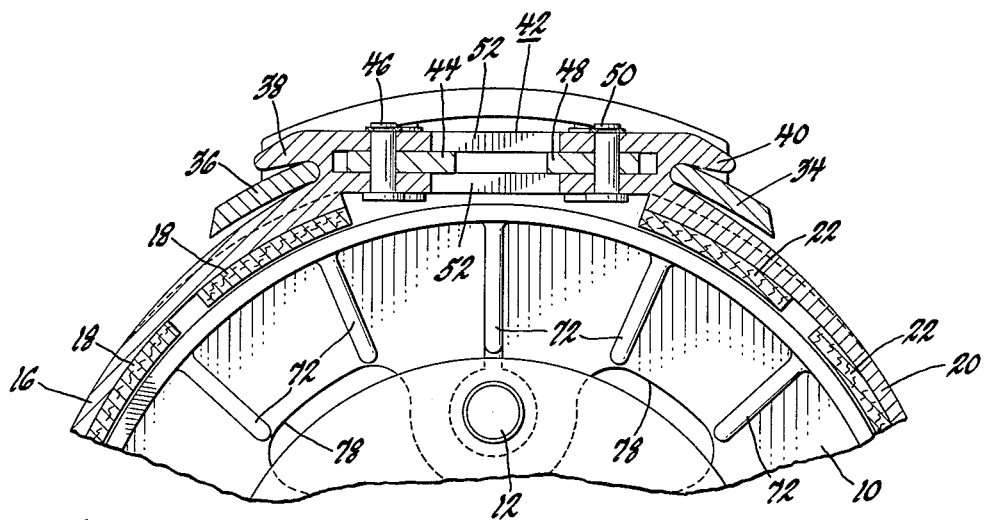
FIGURE 4 is a sectional view taken along line 4—4 of FIGURE 3.

Referring to FIGURE 4, the hook portion 38 will disengage itself from the holding flange 36 and will tend to drive the parallelogram linking mechanism 42 in a clockwise direction around the drum 10. The parallelogram linkage, being connected to the brake shoe 20 and the outwardly projecting hook portion 40 at pivot point 50, will therefore remain stationary due to the engagement of the hook portion 40 with the holding flange 34. Due to the floating nature of the brake shoes 16 and 20, the lining 22, attached to the brake shoe 20, will be pulled into engagement with the rotating, outer periphery of the drum 10. In this mode of operation, the parallelogram linkage will be pivoting around a fixed point 50 to bring the brake shoe 16 and the brake shoe 20 into engagement with the drum 10, thus providing braking action.

If the wheel 68 is rotating in a counterclockwise direction, as viewed in FIGURE 1, a slightly different operational sequence takes place. Referring again to FIGURE 3, as hydraulic pressure to the wheel cylinder 32 drives the piston rod 58 in the direction of the link 48, the same sequence as previously described will take place up to the point where the lining 22, carried by the brake shoe 20, makes contact with a counterclockwise rotating drum.

Referring to FIGURE 4, thereafter, the brake shoe 20 begins to be drawn in a counterclockwise fashion in the direction of rotation, thereby drawing the outwardly projecting hook portion 40 from its seat on the holding flange 34, the outwardly projecting hook portion 38 remaining firmly seated against the holding flange 36. Any further movement of the link 48 to the left around the pivot pin 50, as viewed in FIGURE 3, will result in a corresponding counterclockwise rotation of the link 44 around the now fixed pivot point 46. As further pressure is exerted against the link 48 in a clockwise manner around the point 50, additional force will be transmitted to the linings 18 and 22 while they bear against the drum 10.

It should be noted that, due to the relative distance between the slot 56 and the point 50 as compared to the distance between the point 50 and the pivotal connection of the link 52, a force multiplication takes place. This force multiplication is even greater when, during operation of the emergency brake through the cable 60, the link 48 is pulled from point 60 by the holding assembly 64.

It should also be noted that, as the braking action takes place and after the braking action is completed, while the vehicle is still in motion, the vanes 70 and 72 have been driving cooling air against the inside surface of the drum 10. This cooling air aids in the dissipation of the heat that inevitably is generated during the frictional contact of the linings 18 and 22 and the rotating drum 10. For purposes of explanation, the surface which contacts the brake linings is referred to as the friction surface and the opposite surface which is cooled by the rotating vanes is referred to as the support surface.

The utility of the present invention is immediately apparent in that the force generated in a normal hydraulic braking system is multiplied through the lever arrangement of the parallelogram-type linkage. Also, a characteristic problem of braking mechanisms, namely fade, is minimized in this invention in that one of the causes of fade, a brake drum expanding underheat, decreases the effective wheel adjusting stroke required to move the linings 18 and 22 into braking engagement with the drum 10, instead of increasing the required stroke.

Another feature of particular utility is the even greater mechanical advantage enjoyed in the operation of the emergency brake system where pressure on the link 48 at point 62 utilizes the link 48 as a greater length lever arm than during even hydraulic operation.

While the embodiment of the present invention, as herein disclosed, constitutes a preferred form, it is to be understood that other forms might be adopted.

What is claimed is as follows:

1. A braking device comprising; a rotatable brake drum, a plurality of brake shoes circumferentially mounted around the periphery of said brake drum and being adapted to engage the outer periphery of said brake drum during rotation thereof to effect a braking action from the friction generated therebetween, force operable means arranged to move said brake shoes, and parallelogram force multiplying linkage means connected between said brake shoes and said force operable means to multiply a force exerted by said force operable on said brake shoes during brake actuation.

2. A braking device comprising; a rotatable brake drum having a friction surface and a support surface, a plurality of brake shoes mounted in juxtaposed relation to said friction surface, means for cooling said friction surface through said support surface, said brake shoes being adapted to contact said friction surface to impede the rotation of said brake drum, force operable means arranged to move said brake shoes into contact with said brake drum, and linking means interconnecting said force operable means and said brake shoes for effecting a multiplication of the force transmitted from said force operable means to said brake shoes, said linking means having parallel disposed drive links connected together, one of said drive links being anchored and another engaging said force operable means.

3. A braking device comprising; a rotatable brake drum, a plurality of brake shoes adapted to contact the exterior surface of said brake drum, said brake shoes being attached on first ends in operative association and having second ends linked together, parallely disposed second end force multiplying linking means having portions adapted to draw said plurality of brake shoes tightly around said brake drum during rotation thereof to impede drum rotation, and hydraulic operable means connected to said linking means for drawing said brake shoes against said rotatable brake drum through said linking means, said linking means being arranged to multiply the mechanical advantage of said hydraulic operable means as it draws said brake shoes into contact with said rotatable brake drum.

4. A motor vehicle braking device comprising; a drum mounted on a vehicle wheel and arranged to rotate therewith, a plurality of brake linings carried by brake shoes mounted circumferentially in proximity to the outer periphery of said drum, parallel force multiplying linking means engaging opposed ends of the brake shoes, and hydraulic operable means connected to said linking means and being adapted to drive said linking means when operated, thereby drawing said brake shoe carried linings into engagement with the outer periphery of said drum to effect a braking action for a motor vehicle.

5. A motor vehicle braking device comprising; a brake drum carried by a wheel of a motor vehicle, a plurality of brake shoes carrying friction inducing means mounted in close proximity to the outer periphery of said brake drum and being adapted to come into friction contact therewith, said brake shoes each having a first and second end, parallelogram-type linking means adapted for force multiplying and engaging said brake shoe first ends for drawing said brake shoe first ends towards each other thereby bringing said friction inducing means into contact with the outer periphery of said brake drum to cause a braking action, and means arranged to operate said linking means in response to hydraulic pressure, the second ends of said brake shoes being adjustably connected to vary the proximity of said friction inducing material to said brake drum.

6. A motor vehicle braking device comprising; a brake drum disposed for rotating movement and being carried by a wheel of a motor vehicle, a plurality of brake shoes including friction inducing means carried thereby and being disposed in close proximity to an outer peripheral portion of said brake drum and being adapted to come into contact therewith, linking means including a plurality of connected parallel force multiplication links and engaging said plurality of brake shoes, and means arranged to operate said linking means in response to hydraulic pressure, said brake shoes each having a first and a second end, one of said brake shoe first ends cooperating with another of said brake shoe first ends to bring said brake shoes in closer proximity to the outer periphery of said brake drum thereby causing said friction inducing means to engage the outer periphery to impede the rotation of a wheel of said motor vehicle, said one and another brake shoe first ends having hooked portions adapted to engage said linking means as said linking means moves in response to hydraulic pressure, said linking means including a lever portion having two pressure points thereon, one of said pressure points engaging said hydraulic pressure means to provide an increased mechanical advantage for drawing said brake shoes toward said brake drum in response to hydraulic pressure, and the other of said lever portion pressure points being connected to manually operable means for drawing said brake shoes against said brake drum at a greater mechanical advantage than that available for hydraulic operation.

7. A motor vehicle braking device comprising; a brake drum carried by a wheel of a motor vehicle and having a series of finned portions adapted to drive a cooling fluid against said brake drum during rotation thereof, a plurality of brake shoes carrying friction inducing material thereon and arranged to engage an outer peripheral surface of said brake drum in selective response to a hydraulic force and a mechanical force, parallelogram-type linking means having portions cooperating with said brake shoes and a lever portion having a plurality of pressure points for actuation thereof, an hydraulic cylinder disposed to contact one of said plurality of lever carried pressure points to gain a first mechanical advantage for operation thereof, and mechanically operable means arranged to engage said lever portion at another of said plurality of pressure points to gain a second mechanical advantage for operation thereof greater than the mechanical advantage available for hydraulic operation, said brake shoes being arranged in circumferential relationship to said brake drum and being adapted to be drawn into contact with said periphery to effect a braking action for the wheel of the motor vehicle.

8. In a braking device for a motor vehicle having brake shoes coming into contact with the outer periphery of a brake drum, a linking device comprising; parallelogram-type linking means having portions engaging said brake shoes for drawing said brake shoes into braking contact with said drum and lever means having a plurality of pressure points disposed at different distances from the driving pivot of said parallelogram-type linking means, a first of said pressure points being engaged by hydraulic operable means for hydraulic operation of said braking system, a second of said pressure points being located at a greater distance from the driving pivot and being arranged to be engaged by manually operable means to provide a greater mechanical advantage for mechanical operation thereof than available for hydraulic operation.

References Cited by the Examiner

UNITED STATES PATENTS

| | | | |
|---|---|---|---|
| 1,701,505 | 2/1929 | Perrot | 188—77 X |
| 2,098,125 | 11/1937 | Yoxall | 188—77 |
| 2,109,940 | 3/1938 | Clouse | 188—77 X |
| 2,468,252 | 4/1949 | Borland | 188—77 X |
| 2,992,707 | 7/1961 | Lewis | 188—77 |

MILTON BUCHLER, *Primary Examiner.*

RALPH B. BLAKESLEE, ARTHUR L. LA POINT,
*Examiners.*